US012504995B2

(12) United States Patent
Kumar et al.

(10) Patent No.: US 12,504,995 B2
(45) Date of Patent: Dec. 23, 2025

(54) TECHNIQUES FOR CLOUD AGNOSTIC DISCOVERY OF CLUSTERS OF A CONTAINERIZED APPLICATION ORCHESTRATION INFRASTRUCTURE

(71) Applicant: ServiceNow, Inc., Santa Clara, CA (US)

(72) Inventors: Aditya Kumar, Bangalore (IN); Manish S. V. Kumar, Bangalore (IN); Hail Tal, Petah Tikvah (IL); Abhishek Kumar, Bangalore (IN); Tal Kapon, Petah Tikva (IL)

(73) Assignee: ServiceNow, Inc., Santa Clara, CA (US)

( * ) Notice: Subject to any disclaimer, the term of this patent is extended or adjusted under 35 U.S.C. 154(b) by 747 days.

(21) Appl. No.: 17/804,713

(22) Filed: May 31, 2022

(65) Prior Publication Data

US 2023/0385121 A1 Nov. 30, 2023

(51) Int. Cl.
*G06F 9/50* (2006.01)
*G06F 9/455* (2018.01)

(52) U.S. Cl.
CPC ........ *G06F 9/5072* (2013.01); *G06F 9/45558* (2013.01); *G06F 2009/4557* (2013.01); *G06F 2009/45579* (2013.01); *G06F 2009/45583* (2013.01)

(58) Field of Classification Search
None
See application file for complete search history.

(56) References Cited

U.S. PATENT DOCUMENTS

| 5,978,594 | A  | 11/1999 | Bonnell |
| 6,321,229 | B1 | 11/2001 | Goldman |
| 6,609,122 | B1 | 8/2003 | Ensor |
| 6,799,189 | B2 | 9/2004 | Huxoll |
| 6,816,898 | B1 | 11/2004 | Scarpelli |
| 6,895,586 | B1 | 5/2005 | Brasher |
| 7,020,706 | B2 | 3/2006 | Cates |
| 7,027,411 | B1 | 4/2006 | Pulsipher |

(Continued)

OTHER PUBLICATIONS

L. Hua et al., "A framework to support multi-cloud collaboration," 2020 IEEE World Congress on Services (Services), Beijing, China, 2020, pp. 110-116, doi: 10.1109/SERVICES48979.2020.00036. (Year: 2020).*

*Primary Examiner* — Frank D Mills
(74) *Attorney, Agent, or Firm* — FLETCHER YODER PC

(57) ABSTRACT

A datacenter that hosts a client instance may receive an input to perform discovery against a containerized application orchestration infrastructure that includes computing clusters associated with one or more resource providers. The datacenter retrieves cluster data associated with each computing cluster from the one or more resource providers, automatically creates respective discovery schedules for the computing clusters based on the cluster data, automatically executes the respective discovery schedules for the computing clusters, automatically retrieves respective authentication bearer tokens associated with the computing clusters, automatically performs respective discovery processes against the computing clusters using the respective authentication bearer tokens, and stores the resource data received from the computing clusters in a database.

18 Claims, 6 Drawing Sheets

(56) References Cited

U.S. PATENT DOCUMENTS

| | | |
|---|---|---|
| 7,028,301 B2 | 4/2006 | Ding |
| 7,062,683 B2 | 6/2006 | Warpenburg |
| 7,131,037 B1 | 10/2006 | LeFaive |
| 7,170,864 B2 | 1/2007 | Matharu |
| 7,392,300 B2 | 6/2008 | Anantharangachar |
| 7,610,512 B2 | 10/2009 | Gerber |
| 7,617,073 B2 | 11/2009 | Trinon |
| 7,685,167 B2 | 3/2010 | Mueller |
| 7,689,628 B2 | 3/2010 | Garg |
| 7,716,353 B2 | 5/2010 | Golovinsky |
| 7,769,718 B2 | 8/2010 | Murley |
| 7,783,744 B2 | 8/2010 | Garg |
| 7,877,783 B1 | 1/2011 | Cline |
| 7,925,981 B2 | 4/2011 | Pourheidari |
| 7,930,396 B2 | 4/2011 | Trinon |
| 7,933,927 B2 | 4/2011 | Dee |
| 7,941,506 B2 | 5/2011 | Bonal |
| 7,945,860 B2 | 5/2011 | Vambenepe |
| 7,966,398 B2 | 6/2011 | Wiles |
| 8,051,164 B2 | 11/2011 | Peuter |
| 8,082,222 B2 | 12/2011 | Rangarajan |
| 8,151,261 B2 | 4/2012 | Sirota |
| 8,224,683 B2 | 7/2012 | Manos |
| 8,266,096 B2 | 9/2012 | Navarrete |
| 8,346,752 B2 | 1/2013 | Sirota |
| 8,380,645 B2 | 2/2013 | Kowalski |
| 8,402,127 B2 | 3/2013 | Solin |
| 8,457,928 B2 | 6/2013 | Dang |
| 8,478,569 B2 | 7/2013 | Scarpelli |
| 8,554,750 B2 | 10/2013 | Rangaranjan |
| 8,612,408 B2 | 12/2013 | Trinon |
| 8,646,093 B2 | 2/2014 | Myers |
| 8,674,992 B2 | 3/2014 | Poston |
| 8,743,121 B2 | 6/2014 | De Peuter |
| 8,745,040 B2 | 6/2014 | Kowalski |
| 8,812,539 B2 | 8/2014 | Milousheff |
| 8,818,994 B2 | 8/2014 | Kowalski |
| 8,832,652 B2 | 9/2014 | Mueller |
| 8,887,133 B2 | 11/2014 | Behnia |
| 9,015,188 B2 | 4/2015 | Behne |
| 9,037,536 B2 | 5/2015 | Vos |
| 9,065,783 B2 | 6/2015 | Ding |
| 9,098,322 B2 | 8/2015 | Apte |
| 9,122,552 B2 | 9/2015 | Whitney |
| 9,137,115 B2 | 9/2015 | Mayfield |
| 9,239,857 B2 | 1/2016 | Trinon |
| 9,317,327 B2 | 4/2016 | Apte |
| 9,323,801 B2 | 4/2016 | Morozov |
| 9,363,252 B2 | 6/2016 | Mueller |
| 9,412,084 B2 | 8/2016 | Kowalski |
| 9,467,344 B2 | 10/2016 | Gere |
| 9,535,737 B2 | 1/2017 | Joy |
| 9,613,070 B2 | 4/2017 | Kumar |
| 9,645,833 B2 | 5/2017 | Mueller |
| 9,654,473 B2 | 5/2017 | Miller |
| 9,659,051 B2 | 5/2017 | Hutchins |
| 9,766,935 B2 | 9/2017 | Kelkar |
| 9,792,387 B2 | 10/2017 | George |
| 9,805,322 B2 | 10/2017 | Kelkar |
| 9,852,165 B2 | 12/2017 | Morozov |
| 10,002,203 B2 | 6/2018 | George |
| 2021/0240542 A1* | 8/2021 | Nguyen ................ G06F 9/5083 |
| 2021/0342193 A1* | 11/2021 | Anand ................ G06F 9/5077 |
| 2022/0038544 A1* | 2/2022 | Grinstein ............ G06F 9/45558 |
| 2022/0188336 A1* | 6/2022 | Sen ................ G06F 16/2282 |
| 2023/0164131 A1* | 5/2023 | G ................ H04L 63/0807 726/4 |
| 2023/0239301 A1* | 7/2023 | Ivanov ................ H04L 63/102 726/1 |

* cited by examiner

TECHNIQUES FOR CLOUD AGNOSTIC DISCOVERY OF CLUSTERS OF A CONTAINERIZED APPLICATION ORCHESTRATION INFRASTRUCTURE

BACKGROUND

The present disclosure relates generally to automatically discovering each cluster of a containerized application orchestration infrastructure, and, more specifically, automatically discovering resource data associated with each cluster of the containerized application orchestration infrastructure across different cloud services without receiving user credentials as input to discover the resource data associated with each cluster of the containerized application orchestration infrastructure.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Organizations, regardless of size, rely upon access to information technology (IT) and data and services for their continued operation and success. A respective organization's IT infrastructure may have associated hardware resources (e.g., computing devices, load balancers, firewalls, switches, etc.) and software resources (e.g., productivity software, database applications, custom applications, and so forth). Over time, more and more organizations have turned to cloud computing approaches to supplement or enhance their IT infrastructure solutions.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing-based services. By doing so, users are able to access computing resources on demand that are located at remote locations. These resources may be used to perform a variety of computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able to redirect their resources to focus on their enterprise's core functions.

In modern communication networks, examples of cloud computing services a user may utilize include so-called infrastructure as a service (IaaS), software as a service (SaaS), and platform as a service (PaaS) technologies. IaaS is a model in which providers abstract away the complexity of hardware infrastructure and provide rapid, simplified provisioning of virtual servers and storage, giving enterprises access to computing capacity on demand. In such an approach, however, a user may be left to install and maintain platform components and applications. SaaS is a delivery model that provides software as a service rather than an end product. Instead of utilizing a local network or individual software installations, software is typically licensed on a subscription basis, hosted on a remote machine, and accessed by client customers as needed. For example, users are generally able to access a variety of enterprise and/or information technology (IT)-related software via a web browser. PaaS acts as an extension of SaaS that goes beyond providing software services by offering customizability and expandability features to meet a user's needs. For example, PaaS can provide a cloud-based developmental platform for users to develop, modify, and/or customize applications and/or automate enterprise operations without maintaining network infrastructure and/or allocating computing resources normally associated with these functions.

Recently, the use of containerized software applications among individuals and/or enterprises has risen in popularity. Individuals and/or enterprises utilize a containerized application orchestration infrastructure (e.g., an engine) to dynamically distribute and manage containerized software applications across multiple computing devices. For example, a containerized software application (e.g., a container) is a stand-alone executable package of a software application that includes components needed to run the software application, including the software application's code, runtime, system tools, system libraries, and settings, among other components. The container allows the software application to run consistently in different operating environments regardless of the type of operation environment. As such, individuals and/or enterprises often utilize a containerized application orchestration infrastructure, such as a KUBERNETES® cluster infrastructure or a DOCKER SWARM® engine, to deploy, scale, and manage such containerized software applications. Accordingly, improved techniques for discovering each cluster of a containerized application orchestration infrastructure are desirable.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The presently disclosed techniques relate to automatically discovering data associated with each cluster of a containerized application orchestration infrastructure without requiring an individual and/or an enterprise to submit credential information associated with each resource provider of each cluster to access each cluster. In particular, a system automatically retrieves cluster data associated with each cluster of the containerized application orchestration infrastructure from respective resource providers. The system then stores the cluster data in a database and automatically creates respective discovery schedules for each cluster of the containerized application orchestration infrastructure based on the cluster data. Thereafter, the system automatically executes the respective discovery schedules for each cluster of the containerized application orchestration infrastructure. For instance, the system automatically retrieves respective authentication bearer tokens associated with each cluster of the containerized application orchestration infrastructure, automatically performs discovery against each cluster of the containerized application orchestration infrastructure to retrieve resource data associated with each cluster, and stores the resource data associated with each cluster in the database. In this way, the presently disclosed techniques automatically discover data associated with respective resources of each cluster of the containerized application orchestration in a single process without requiring individuals and/or enterprises to manually input authentication credentials for each resource provider associated with each cluster or to manually create discovery schedules for each type of cluster.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
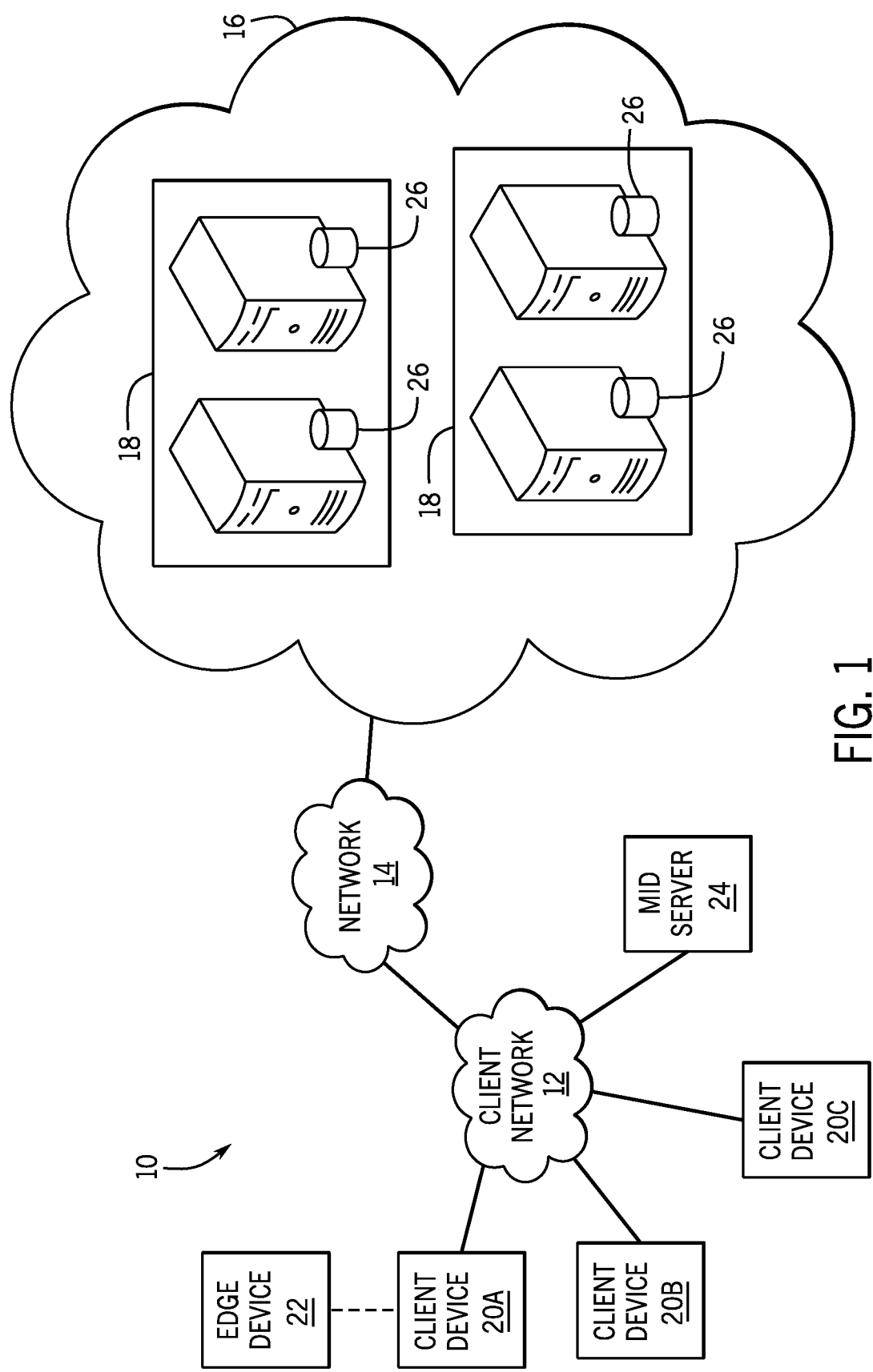
FIG. 1 is a block diagram of an embodiment of a multi-instance cloud architecture in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code. As used herein, the term "configuration item" or "CI" refers to a record for any component (e.g., computer, device, piece of software, database table, script, webpage, piece of metadata, and so forth) in an enterprise network, for which relevant data, such as manufacturer, vendor, location, or similar data, is stored, such as in a CMDB.

As mentioned above, individuals and/or enterprises have increasingly begun to use containerized application orchestration infrastructures to deploy, scale, and manage containerized software applications among various devices. A container software application (e.g., a container) is a stand-alone executable package of a software application that includes components needed to run the software application, including the software application's code, runtime, system tools, system libraries, and settings, among other components. The container allows the software application to run consistently in different operation environments regardless of the type of operation environment. Individuals and/or enterprises use a containerized application orchestration infrastructure to deploy containers among various devices in a network and manage such deployments over time.

One type of containerized application orchestration infrastructure is a KUBERNETES® cluster infrastructure. A KUBERNETES® cluster infrastructure may include various clusters of nodes or groups of nodes that execute one or more containers. However, conventional techniques for discovering resources of a KUBERNETES® cluster infrastructure or other types of containerized application orchestration infrastructures are often time consuming, inefficient, tedious, and prone to error. In particular, individuals and/or enterprises have to manually create discovery schedules for each type of cluster in a KUBERNETES® cluster infrastructure and manually provide authentication credentials for each resource provider of each type of cluster. This process can consume large quantities of resources and time if the KUBERNETES® cluster infrastructure contains hundreds or thousands of types of clusters.

Accordingly, the presently disclosed techniques are directed to automatically discovering data associated with each cluster of a containerized application orchestration infrastructure without requiring an individual and/or an enterprise to submit credential information associated with each resource provider of each cluster to access each cluster. In particular, a system automatically retrieves cluster data associated with each cluster of the containerized application orchestration infrastructure from respective resource providers. The system then stores the cluster data in a database and automatically creates respective discovery schedules for each cluster of the containerized application orchestration infrastructure based on the cluster data. Thereafter, the system automatically executes the respective discovery schedules for each cluster of the containerized application orchestration infrastructure. For instance, the system automatically retrieves respective authentication bearer tokens associated with each cluster of the containerized application orchestration infrastructure, automatically performs discovery against each cluster of the containerized application orchestration infrastructure to retrieve resource data associated with each cluster, and stores the resource data associated with each cluster in the database. In this way, the embodiments described herein provide improved techniques for automatically discovering data associated with respective resources of each cluster of the containerized application orchestration in a single process without requiring individuals and/or enterprises to manually input authentication credentials for each resource provider associated with each cluster or to manually create discovery schedules for each type of cluster. Accordingly, the techniques minimize the amount of time and resources used to discover such data.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a cloud computing system 10 where embodiments of the present disclosure may operate, is illustrated. The cloud computing system 10 may include a client network 12, a network 14 (e.g., the Internet), and a cloud-based platform 16. In some implementations, the cloud-based platform 16 may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20 may be computing systems and/or other types of computing devices generally referred to as Internet of Things (IoT) devices that access cloud computing services, for example, via a web browser application or via an edge device 22 that may act as a gateway between the client devices 20 and the platform 16. FIG. 1 also illustrates that the client network 12 includes an administration or managerial device, agent, or server, such as a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 14. The network 14 may include one or more computing networks, such as other LANs, wide area networks (WAN), the Internet, and/or other remote networks, to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), IEEE 802.11 networks, and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices 20 are able to build and execute applications for various enterprise, IT, and/or other organization-related functions. In one embodiment, the network hosting the platform 16 is implemented on the one or more data centers 18, where each data center could correspond to a different geographic location. Each of the data centers 18 includes a plurality of virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include, but are not limited to a web server (e.g., a unitary Apache installation), an application server (e.g., unitary JAVA Virtual Machine), and/or a database server (e.g., a unitary relational database management system (RDBMS) catalog).

To utilize computing resources within the platform 16, network operators may choose to configure the data centers 18 using a variety of computing infrastructures. In one embodiment, one or more of the data centers 18 are configured using a multi-tenant cloud architecture, such that one of the server instances 26 handles requests from and serves multiple customers. Data centers 18 with multi-tenant cloud architecture commingle and store data from multiple customers, where multiple customer instances are assigned to one of the virtual servers 26. In a multi-tenant cloud architecture, the particular virtual server 26 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 26 causing outages for all customers allocated to the particular server instance.

In another embodiment, one or more of the data centers 18 are configured using a multi-instance cloud architecture to provide every customer its own unique customer instance or instances. For example, a multi-instance cloud architecture could provide each customer instance with its own dedicated application server(s) and dedicated database server(s). In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules. An example of implementing a customer instance within a multi-instance cloud architecture will be discussed in more detail below with reference to FIG. 2.

Figure 2:
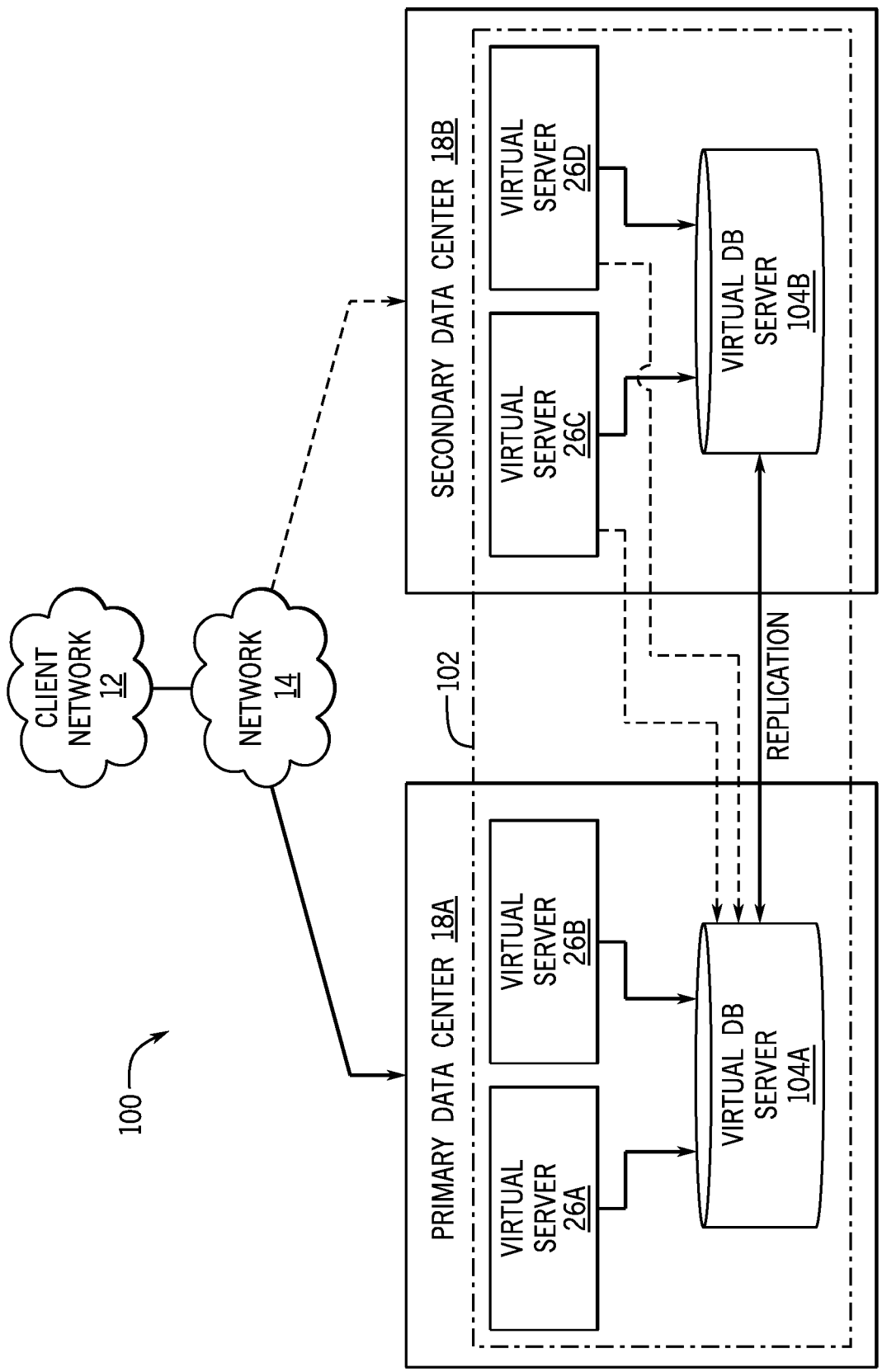
FIG. 2 is a schematic diagram of an embodiment of a multi-instance cloud architecture in which embodiments of the present disclosure may operate.

FIG. 2 is a schematic diagram of an embodiment of a multi-instance cloud architecture 100 where embodiments of the present disclosure may operate. FIG. 2 illustrates that the multi-instance cloud architecture 100 includes the client network 12 and the network 14 that connect to two (e.g., paired) data centers 18A and 18B that may be geographically separated from one another and provide data replication and/or failover capabilities. Using FIG. 2 as an example, network environment and service provider cloud infrastructure client instance 102 (also referred to herein as a client instance 102) is associated with (e.g., supported and enabled by) dedicated virtual servers (e.g., virtual servers 26A, 26B, 26C, and 26D) and dedicated database servers (e.g., virtual database servers 104A and 104B). Stated another way, the virtual servers 26A-26D and virtual database servers 104A and 104B are not shared with other client instances and are specific to the respective client instance 102. In the depicted example, to facilitate availability of the client instance 102, the virtual servers 26A-26D and virtual database servers 104A and 104B are allocated to two different data centers 18A and 18B so that one of the data centers 18 acts as a backup data center. Other embodiments of the multi-instance cloud architecture 100 could include other types of dedicated virtual servers, such as a web server. For example, the client instance 102 could be associated with (e.g., supported and enabled by) the dedicated virtual servers 26A-26D, dedicated virtual database servers 104A and 104B, and additional dedicated virtual web servers (not shown in FIG. 2).

Although FIGS. 1 and 2 illustrate specific embodiments of a cloud computing system 10 and a multi-instance cloud architecture 100, respectively, the disclosure is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 26A, 26B, 26C, 26D and virtual database servers 104A, 104B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
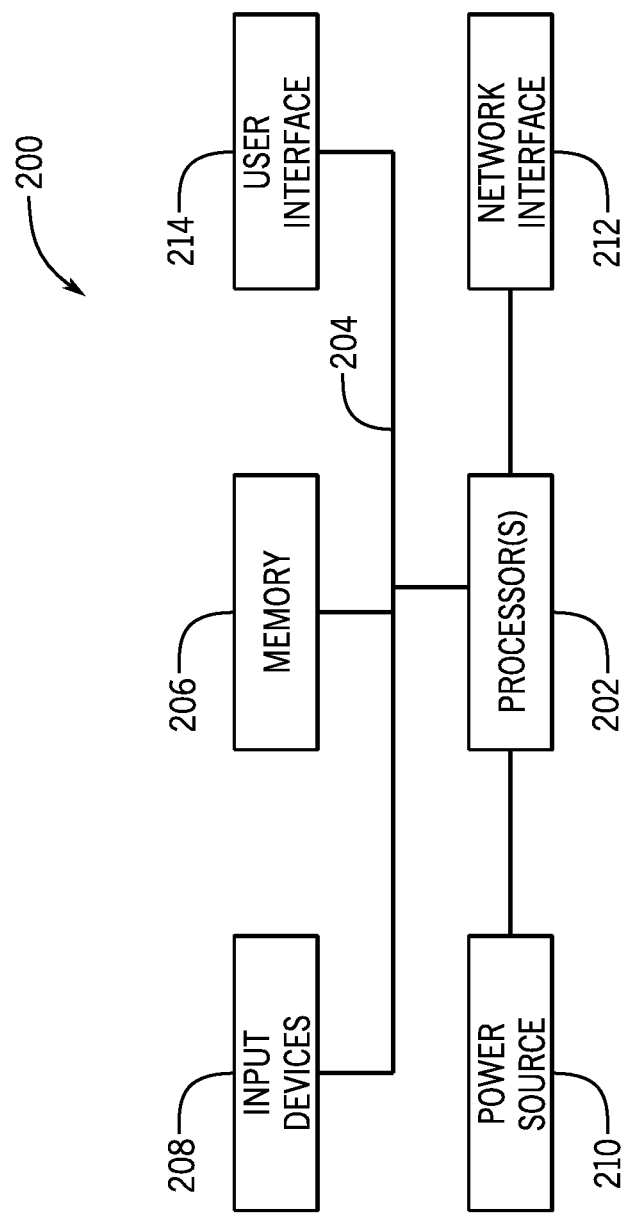
FIG. 3 is a block diagram of a computing device utilized in a computing system that may be present in FIG. 1 or 2, in accordance with aspects of the present disclosure.

By way of background, it may be appreciated that the present approach may be implemented using one or more processor-based systems such as shown in FIG. 3. Likewise, applications and/or databases utilized in the present approach may be stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 200 and their potential interconnections or communication paths, such as along one or more busses. As illustrated, the computing system 200 may include various hardware components such as, but not limited to, one or more processors 202, one or more busses 204, memory 206, input devices 208, a power source 210, a network interface 212, a user interface 214, and/or other computer components useful in performing the functions described herein.

The one or more processors 202 may include one or more microprocessors capable of performing instructions stored in the memory 206. Additionally, or alternatively, the one or more processors 202 may include application-specific integrated circuits (ASICs), field-programmable gate arrays (FPGAs), and/or other devices designed to perform some or all of the functions discussed herein without calling instructions from the memory 206.

With respect to other components, the one or more busses 204 include suitable electrical channels to provide data and/or power between the various components of the computing system 200. The memory 206 may include any tangible, non-transitory, and computer-readable storage media. Although shown as a single block in FIG. 1, the memory 206 can be implemented using multiple physical units of the same or different types in one or more physical locations. The input devices 208 correspond to structures to input data and/or commands to the one or more processors 202. For example, the input devices 208 may include a mouse, touchpad, touchscreen, keyboard, and the like. The power source 210 can be any suitable source for power of the various components of the computing device 200, such as line power and/or a battery source. The network interface 212 includes one or more transceivers capable of communicating with other devices over one or more networks (e.g., a communication channel). The network interface 212 may provide a wired network interface or a wireless network interface. A user interface 214 may include a display that is configured to display text or images transferred to it from the one or more processors 202. In addition and/or alternative to the display, the user interface 214 may include other devices for interfacing with a user, such as lights (e.g., LEDs), speakers, and the like.

Figure 4:
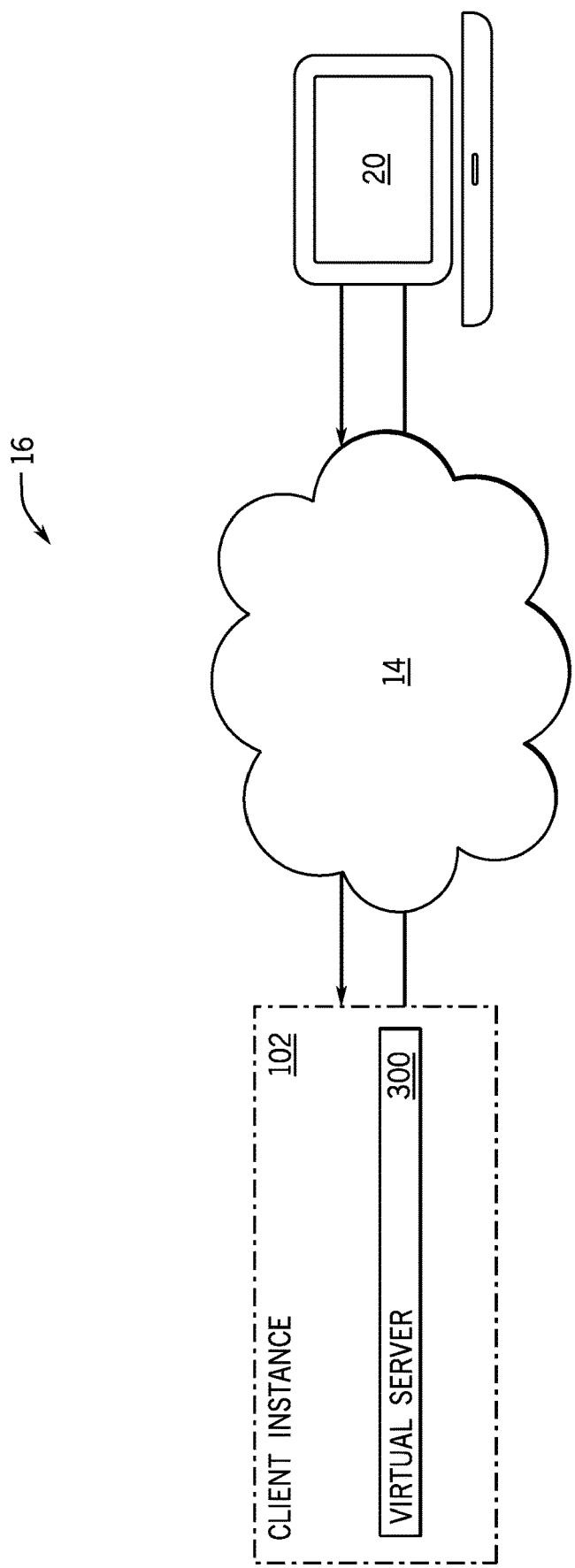
FIG. 4 is a block diagram illustrating an embodiment in which a virtual server supports and enables the client instance, in accordance with aspects of the present disclosure.

With the preceding in mind, FIG. 4 is a block diagram illustrating an embodiment in which a virtual server 300 supports and enables the client instance 102, according to one or more disclosed embodiments. More specifically, FIG. 4 illustrates an example of a portion of a service provider cloud infrastructure, including the cloud-based platform 16 discussed above. The cloud-based platform 16 is connected to a client device 20 via the network 14 to provide a user interface to network applications executing within the client instance 102 (e.g., via a web browser running on the client device 20). Client instance 102 is supported by virtual servers 26 similar to those explained with respect to FIG. 2, and is illustrated here to show support for the disclosed functionality described herein within the client instance 102. Cloud provider infrastructures are generally configured to support a plurality of end-user devices, such as client device(s) 20, concurrently, wherein each end-user device is in communication with the single client instance 102. Also, cloud provider infrastructures may be configured to support any number of client instances, such as client instance 102, concurrently, with each of the instances in communication with one or more end-user devices. As mentioned above, an end-user may also interface with client instance 102 using an application that is executed within a web browser.

Figure 5:
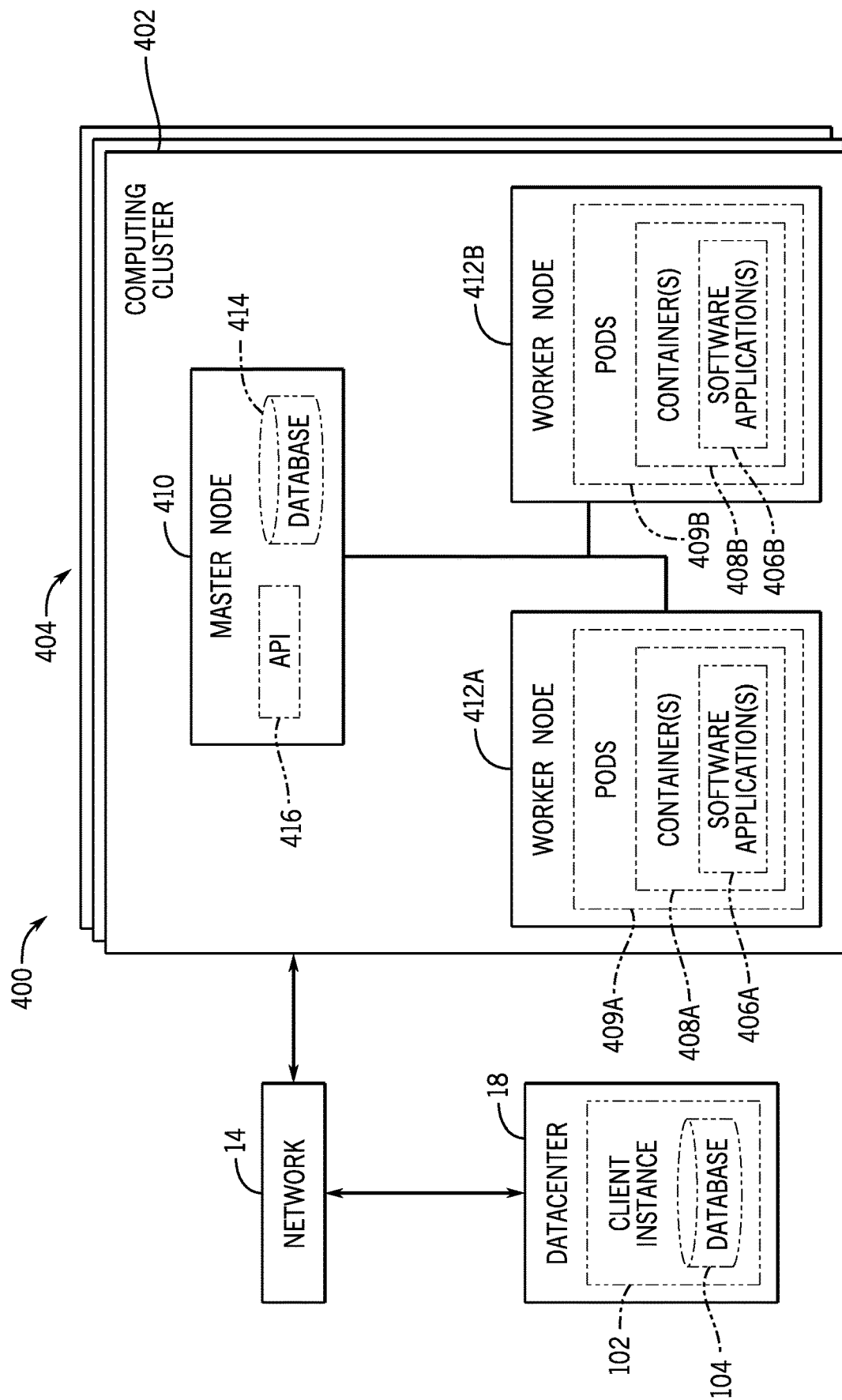
FIG. 5 is a block diagram illustrating an embodiment in which the client instance automatically performs discovery against each cluster of a containerized application orchestration infrastructure, in accordance with aspects of the present disclosure.

With the foregoing in mind, FIG. 5 is a schematic diagram of an embodiment of a system 400 for automatically discovering resource data associated with one or more resources of one or more computing clusters 402 of a containerized application orchestration infrastructure 404 that may be accessed by the client instance 102 of FIG. 2. For instance, the client instance 102 is hosted by the datacenter 18 (e.g., datacenters 18A, 18B in FIG. 2) and includes the database 104 (e.g., virtual database servers 104A, 104B in FIG. 2). Additionally, one or more computing clusters 402 may be provided by a third-party resource provider (e.g., a cloud resource provider), such as AMAZON WEB SERVICES®, MICROSOFT® Azure, GOOGLE® Cloud, or the like. As mentioned above, the containerized application orchestration infrastructure 404 includes one or more computing clusters 402 that are configured to execute containerized software applications 406A and 406B in containers 408A and 408B, respectively.

Each container 408A and 408B is a software package that includes respective runtime environments needed to execute the respective software applications 406A, 406B. The containers 408A, 408B may include code (e.g., binary code) that defines the respective software applications 406A, 406B, libraries utilized by the respective software applications 406A, 406B, and configuration files utilized by the respective software applications 406A, 406B. As such, the respective software applications 406A, 406B in each container 408A, 408B may be executed on a wide variety of operating systems and underlying infrastructures irrespective of the computing environment.

In certain embodiments, each container 408A, 408B may be organized into respective pods 409A, 409B. In some embodiments, for example, each pod 409A, 409B may include respective containers 408A, 408B and one or more additional containers including one or more additional software applications. In any case, containers in a pod (e.g., 408A, 408B) may share storage space, an internet protocol (IP) address, IP port space, an operating system namespace, or the like. The pods 408A, 408B, for example, may include KUBERNETES® pods, DOCKER SWARM® tasks, MESOS® pods, KONTENA® stacks, or the like.

Each computing cluster 402 includes a group of nodes for deploying the respective software applications 406A, 406B in each container 408A, 408B. As illustrated in FIG. 5, the computing cluster 402 includes a master node 410 and multiple worker nodes 412A, 412B that host the respective software applications 406A, 406B. The master node 410 manages the number, distribution, and scheduling of pods, containers, software application, or a combination thereof, among the workers nodes 412A, 412B within the computing cluster 402. Additionally, the master node 410 may include a database 414 that stores data associated with an operational state of the computing cluster 402. For example, the database 414 may store configuration data indicative of an arrangement of the worker nodes 412A, 412B, the containers 408A, 408B, the pods 409A, 409B, and the software applications 406A, 406B within the computing cluster 402. The database 414 may also store configuration data indicative of the type of containerized application orchestration infrastructure 404 (e.g., KUBERNETES®, DOCKER®, or the like) associated with the computing cluster 402, one or more IP addresses associated with the computing cluster 402, an identifier of the computing cluster 402, an identifier of the resource provider associated with the computing cluster 402, a UID of a resource of the computing cluster 402 and/or the containerized application orchestration infrastructure 404, a fully qualified domain name (FQDN) of a resource of the computing cluster 402 and/or the containerized application orchestration infrastructure 404, or the like.

The client instance 102 may communicate with the master node 410 via an application programming interface (API) 416. For instance, the client instance 102 may call the API 416 to specify a number of copies of software applications 406A, 406B to be executed by the computing cluster 402, to transmit and apply updates to the software applications 406A, 406B, to manage or access data associated with the computing cluster 402, or the like. For example, the client instance 102 may call the API 416 to communicate with the worker nodes 412A, 412B to monitor and control execution of the pods 409A, 409B, the containers 408A, 408B, the software applications 406A, 406B, or a combination thereof. The client instance 102 may also call the API 416 to access configuration data associated with the computing cluster 402, the containerized application orchestration infrastructure 404 associated with the computing cluster 402, the master node 410, the worker nodes 412A, 412B, the pods 409A, 409B, the containers 408A, 408B, the software applications 406A, 406B, or a combination thereof. For example, the configuration data may include one or more parameters associated with the computing cluster 402, such as a URL associated with each computing cluster 402, a credentials alias associated with computing cluster 402, a namespace associated with each computing cluster 402, a prometheus URL associated with each computing cluster, or the like.

Figure 6:
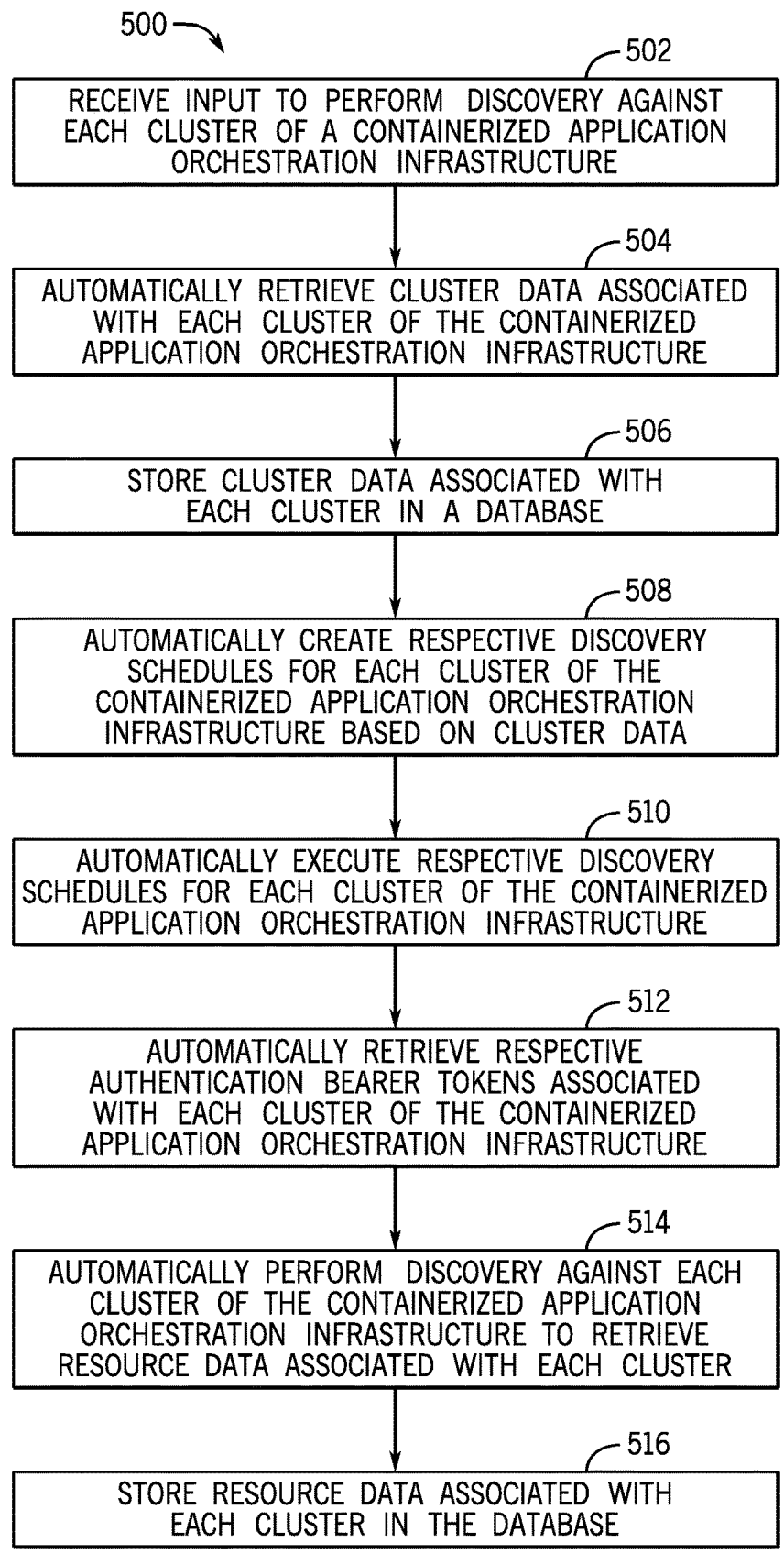
FIG. 6 is a flow chart of a process for automatically creating respective discovery schedules for each cluster of the containerized application orchestration infrastructure and automatically performing discovery against each cluster of the containerized application orchestration infrastructure in accordance with each discovery schedule, in accordance with aspects of the present disclosure.

FIG. 6 illustrates a flow chart of a process 500 that may be performed by the cloud instance 102 hosted by the datacenter 18 for automatically discovering data associated with each computing cluster 402 of the computerized application orchestration infrastructure 404 in a single process without requiring an individual and/or an enterprise to submit credential information for accessing each computing cluster 402. At block 502, the client instance 102 may receive an input from a client device 20 to perform discovery against each computing cluster 402 of a containerized application orchestration infrastructure 404. In certain embodiments, the input may be indicative of a user selection of an identifier associated with the containerized application orchestration infrastructure 404.

After the client instance 102 receives the input to perform discovery against the containerized application orchestration infrastructure 404, at block 504, the client instance 102 automatically retrieves cluster data associated with each computing cluster 402 of the containerized application orchestration infrastructure 404. In certain embodiments, the cluster data includes respective identifiers associated with each type of computing cluster 402 in the containerized application orchestration infrastructure 404, a quantity of each type of computing cluster 402 in the containerized application orchestration infrastructure 404, respective IP addresses associated with each computing cluster 402 in the containerized application orchestration infrastructure 404, one or more UIDs associated with each computing cluster 402 in the containerized application orchestration infrastructure 404, one or more FQDNs associated with each computing cluster 402 in the containerized application orchestration infrastructure 404, or the like. For instance, each type of computing cluster 402 may be provided by a respective resource provider, such as AMAZON WEB SERVICES®, MICROSOFT® Azure, GOOGLE® Cloud, and the like. In some embodiments, in order to retrieve the cluster data associated with each computing cluster 402 associated with the containerized application orchestration infrastructure 404, the client instance 102 may transmit respective queries to the respective resource providers of each type of computing cluster 402 in the containerized application orchestration infrastructure 404 for the cluster data associated with each computing cluster 402. In other embodiments, the client instance 102 may perform respective API calls to the respective resource providers of each type of computing cluster 402 in the containerized application orchestration infrastructure 404 for the cluster data associated with each computing cluster 402. For instance, the client instance 102 may receive an account identifier associated with the individual and/or enterprise, access information (e.g., a key) associated with the individual and/or enterprise, or the like, and generate the query or the API call to the resource providers based on the received information. After receiving the query or the API call from the client instance 102, each resource provider transmits the cluster data associated with respective computing clusters 402 provided by the resource provider to the client instance 102.

After receiving the cluster data associated with each computing cluster 402 from the resource providers of the computing clusters 402, at block 506, the client instance 102 stores the cluster data in the database 104. In some embodiments, the client instance 102 may create a table in the database 104 or update an existing table in the database 104 associated with the containerized application orchestration infrastructure 404. The client instance 102 may automatically populate the table in the database 104 with one or more parameters of the received cluster data. For instance, the table may associate respective identifiers of each computing cluster 402 in the containerized application orchestration infrastructure 404 with respective IP addresses of each computing cluster 402, one or more UIDs associated with each computing cluster 402, one or more FQDNs associated with each computing cluster 402, or the like. Additionally, or alternatively, the client instance 102 may create one or more configuration item records in the database 104 based on the received cluster data.

Additionally, after storing the cluster data associated with each computing cluster 402 in the database 104, at block 508, the client instance 102 automatically creates respective discovery schedules for each computing cluster 402 in the containerized application orchestration infrastructure 404 based on the received cluster data. Although FIG. 6 illustrates that the client instance 102 performs block 508 of the process 500 after block 506 of the process 500, it should be understood that, in other embodiments, the client instance 102 may perform block 508 before block 506 or the client instance 102 may perform block 506 in parallel with block 508. In any case, at block 508, the client instance 102 automatically creates a discovery schedule for each computing cluster 402 in the containerized application infrastructure 404 based on the received cluster data. In some embodiments, the client instance 102 may create a data object that includes information regarding how to create the discovery schedule for a particular computing cluster 402 and includes one or more parameters of the cluster data associated with the computing cluster 402 based on the received cluster data. For instance, the data object may be a JavaScript Object Notation (JSON) object or the like. After creating the data object for a computing cluster 402, the client instance 102 creates the discovery schedule for the computing cluster 402 based on the data object and the received cluster data. For instance, the discovery schedule may include a particular time at which discovery is performed against the computing cluster 402, a periodic interval (e.g., weekly, daily, every "n" hours) between the execution of subsequent discovery processes against the computing cluster 402, one or more parameters of the cluster data associated with the computing cluster 402 (e.g., an IP address associated with the computing cluster 402, or the like. In certain embodiments, the client instance 102 may create respective discovery schedules for each computing cluster 402 sequentially, simultaneously, or substantially simultaneously. Additionally, in certain embodiments, after creating each discovery schedule for each computing cluster 402 in the containerized application orchestration infrastructure 404, the client instance 102 stores the discovery schedules in the database 104.

After creating respective discovery schedules for each computing cluster 402 in the containerized application orchestration infrastructure 404 based on the received cluster data, at block 510, the client instance 102 automatically executes the respective discovery schedules for each computing cluster 402. For instance, at block 512, the client instance 102 queries each computing cluster 402 of the containerized application orchestration infrastructure 404 for respective authentication bearer tokens for accessing the corresponding computing clusters 402. In some embodiments, the client instance 102 may perform an API call or a command line interface (CLI) call to each computing cluster 402 for the respective authentication bearer tokens. Each authentication bearer token may be issued by the computing cluster 402 to the client instance 102 in response to the query. For instance, the authentication bearer token provides access to the computing cluster 402 by the client instance 102 that may be limited in scope and/or duration.

After receiving each authentication bearer token for accessing each computing cluster 402 in the containerized application orchestration infrastructure 404, at block 514, the client instance 102 automatically performs discovery against each computing cluster 402 using the corresponding authentication bearer token to access each computing cluster 402. For instance, the client instance 102 may perform respective API calls to each computing cluster 402 of the containerized application orchestration infrastructure 404 (e.g., via API 416) to retrieve resource data associated with each computing cluster 402. In certain embodiments, the resource data includes configuration data associated with each computing cluster 402 and/or resources associated with the computing cluster 402, such as each pod 409A, 409B of the computing cluster 402, each node 410, 412A, 412B of the computing cluster 402, each service provided by each node 410, 412A, 412B of the computing cluster 402, each container 408A, 408B of the computing cluster 402, each image associated with the computing cluster 402, or the like. For instance, the configuration data may include respective identifiers associated with one or more resources (e.g., the computing cluster 402 and/or the resources associated with the computing cluster 402), respective IP addresses associated with one or more resources, an operating system namespace associated with one or more resources, a prometheus URL associated with one or more resources, or the like. Additionally, in some embodiments, the resource data may include one or more types of cluster data described above.

As mentioned above, the client instance 102 performs discovery against each computing cluster 402 in accordance with the respective discovery schedules created for each computing cluster 402. For instance, the client instance 102 may perform discovery against a first computing cluster during a first period of time and against a second computing cluster during a second period of time that is different than the first period of time based on respective discovery schedules associated with the first computing cluster and the second computing cluster. Alternatively, the client instance 102 may perform discovery against the first computing cluster during a first period of time and the client instance 102 may perform discovery against the second computing cluster during a second period of time that at least partially overlaps with the first period of time based on the respective discovery schedules. In this way, the client instance 102 may perform discovery against each computing cluster 402 at similar or different times based on the respective discovery schedules such that a network data transmission efficiency and a network resource utilization efficiency may be optimized.

After performing discovery against each computing cluster 402 to receive the resource data associated with the computing clusters 402, at block 516, the client instance 102 may store the resource in the database 104. In some embodiments, the client instance 102 may create a table in the database 104 or update an existing table in the database 104 with the resource data. Additionally, or alternatively, client instance 102 may create one or more configuration item records in the database 104 based on the resource data. In some embodiments, the resource data stored in the database 104 may update cluster data that was previously stored in the database (e.g., at block 506).

Further, in certain embodiments, the client instance 102 may generate a dependency map based on the cluster data and/or the resource data associated with one or more computing clusters 402. For instance, the dependency map may include respective indications of each resource of the computing clusters 402 and respective indications between each resource of the computing clusters 402. Additionally, or alternatively, the dependency map may also include respective indications of relationships between resources of each computing cluster 402 of the entire containerized application orchestration infrastructure 404. In certain embodiments, after generating the dependency map, the client instance 102 may transmit the dependency map to a client device 20 for display.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
a datacenter configured to host a client instance, wherein the datacenter comprises a processor and memory, accessible by the processor, storing instructions that, when executed by the processor, cause the client instance to perform operations comprising:
  receiving an input to perform discovery against a containerized application orchestration infrastructure, wherein the containerized application orchestration infrastructure comprises a plurality of computing clusters associated with one or more resource providers, and wherein the input comprises an account identifier;
  automatically sending respective queries, generated based on the account identifier, via respective application programming interface (API) calls to the one or more resource providers to request cluster data;
  automatically retrieving the cluster data associated with each computing cluster of the plurality of computing clusters from the one or more resource providers;
  automatically creating respective discovery schedules for the plurality of computing clusters based on the cluster data, wherein at least two of the respective discovery schedules are created simultaneously;
  automatically executing the respective discovery schedules for the plurality of computing clusters to discover resource data, wherein executing the respective discover schedules comprises:
    automatically sending respective requests via respective API calls to the plurality of computing clusters requesting respective accesses;
    automatically retrieving respective authentication bearer tokens associated with the plurality of computing clusters from the plurality of computing clusters; and
    automatically performing respective discovery processes against the plurality of computing clusters using the respective authentication bearer tokens; and
  storing, in a database, the resource data received from the plurality of computing clusters.

2. The system of claim 1, wherein the operations comprise storing, in the database, the cluster data received from the one or more resource providers.

3. The system of claim 1, wherein the respective discovery schedules include respective times at which the respective discovery processes are to be performed against respective computing clusters of the plurality of computing clusters.

4. The system of claim 1, wherein the respective discovery schedules include respective time intervals between subsequent executions of the respective discovery processes against respective computing clusters of the plurality of computing clusters.

5. The system of claim 1, wherein the resource data comprises one or more of: respective identifiers associated with one or more resources of each computing cluster of the plurality of computing clusters, respective namespaces associated with the one or more resources of each computing cluster of the plurality of computing clusters, respective internet protocol (IP) addresses associated with the one or more resources of each computing cluster of the plurality of computing clusters, or one or more identifiers associated with the one or more resources of each computing cluster of the plurality of computing clusters.

6. The system of claim 1, wherein the cluster data comprises one or more of: respective identifiers associated with each type of computing cluster of the plurality of computing clusters, respective quantities of each type of computing cluster of the plurality of computing clusters, respective IP addresses associated with the plurality of computing clusters, respective UIDs associated with the plurality of computing clusters, or respective fully qualified domain names (FQDNs) associated with the plurality of computing clusters.

7. A method, comprising:
receiving, by a datacenter configured to host a client instance, an input to perform discovery against a containerized application orchestration infrastructure, wherein the containerized application orchestration infrastructure comprises a plurality of computing clusters associated with one or more resource providers, and wherein the input comprises an account identifier;
automatically sending respective queries, generated based on the account identifier, via respective application programming interface (API) calls to the one or more resource providers to request cluster data;
automatically retrieving, by the datacenter, the cluster data associated with each computing cluster of the plurality of the computing clusters form the one or more resource providers;
automatically creating, by the datacenter, respective discovery schedules for the plurality of computing clusters based on the cluster data, wherein at least two of the respective discovery schedules are created simultaneously;
automatically executing, by the datacenter, the respective discovery schedules for the plurality of computing clusters to discover resource data, wherein executing the respective discover schedules comprises:
automatically sending respective requests via respective API calls to the plurality of computing clusters requesting respective accesses;
automatically retrieving, by the datacenter, respective authentication bearer tokens associated with the plurality of computing clusters from the plurality of computing clusters; and
automatically performing, by the datacenter using the respective authentication bearer tokens, respective discovery processes against the plurality of computing clusters; and
storing, by the datacenter, the resource data received from the plurality of computing clusters in a database.

8. The method of claim 7, comprising: storing, by the datacenter, the cluster data in the database.

9. The method of claim 8, wherein the resource data includes at least a portion of the cluster data.

10. The method of claim 8, wherein storing the resource data received from the plurality of computing clusters in the database comprises updating at least a portion of the cluster data stored in the database.

11. The method of claim 7, wherein automatically performing the respective discovery processes against the plurality of computing clusters comprises performing a first discovery process against a first computing cluster of the plurality of computing clusters during a first period of time and performing a second discovery process against a second computing cluster of the plurality of computing clusters during a second period of time in accordance with the respective discovery schedules.

12. The method of claim 11, wherein the first period of time at least partially overlaps with the second period of time.

13. The method of claim 11, wherein the first period of time is different than the second period of time.

14. A non-transitory, computer-readable medium, comprising instructions that, when executed by a processor, cause the processor to perform operations comprising:
receiving an input to perform discovery against a containerized application orchestration infrastructure, wherein the containerized application orchestration infrastructure comprises a plurality of computing clusters associated with one or more resource providers, and wherein the input comprises an account identifier;
automatically sending respective queries, generated based on the account identifier, via respective application programming interface (API) calls to the one or more resource providers to request cluster data;
automatically retrieving the cluster data associated with each computing cluster of the plurality of computing clusters from the one or more resource providers;
storing, in a database, cluster data received from the one or more resource providers;
automatically creating respective discovery schedules for the plurality of computing clusters based on the cluster data, wherein at least two of the respective discovery schedules are created simultaneously;
automatically executing the respective discovery schedules for the plurality of computing clusters to discover resource data, wherein executing the respective discover schedules comprises:
automatically sending respective requests via respective API calls to the plurality of computing clusters requesting respective accesses;
automatically retrieving respective authentication bearer tokens associated with the plurality of computing clusters from the plurality of computing clusters; and
automatically performing respective discovery processes against the plurality of computing clusters using the respective authentication bearer tokens; and
storing, in the database, the resource data received from the plurality of computing clusters.

15. The non-transitory, computer-readable medium of claim 14, wherein the respective discovery schedules include respective time intervals between subsequent executions of the respective discovery processes against respective computing clusters of the plurality of computing clusters.

16. The non-transitory, computer-readable medium of claim 14, wherein the containerized application orchestration infrastructure comprises a type of cluster infrastructure configured to execute one or more containers.

17. The non-transitory, computer-readable medium of claim 14, wherein the one or more resource providers comprise a plurality of resource providers, and the plurality of resource providers comprise two or more different cloud resource providers.

18. The non-transitory, computer-readable medium of claim 17, wherein automatically performing the respective discovery processes against the plurality of computing clusters using the respective authentication bearer tokens comprises performing respective application programming interface (API) calls to the plurality of computing clusters using the respective authentication bearer tokens.

\* \* \* \* \*